United States Patent
Ra

(10) Patent No.: US 6,597,910 B1
(45) Date of Patent: Jul. 22, 2003

(54) METHOD FOR MAKING NETWORK DIRECT SYSTEM SELECTION IN A CELLULAR COMMUNICATION SYSTEM

(75) Inventor: Woo-Tae Ra, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/569,750

(22) Filed: May 12, 2000

(30) Foreign Application Priority Data

May 13, 1999 (KR) ............................................ 99-17146

(51) Int. Cl.[7] ................................................. H04Q 7/20
(52) U.S. Cl. ....................... 455/433; 455/432; 455/435
(58) Field of Search ................................. 455/432, 433, 455/435, 445, 406, 436; 370/335, 331

(56) References Cited

U.S. PATENT DOCUMENTS

| | | | | |
|---|---|---|---|---|
| 5,564,068 A | * | 10/1996 | Nguyen | 455/33.1 |
| 5,711,006 A | * | 1/1998 | Brochu et al. | 455/445 |
| 5,797,096 A | * | 8/1998 | Lupien et al. | 455/433 |
| 5,857,153 A | * | 1/1999 | Lupien | 455/422 |
| 5,983,095 A | * | 11/1999 | Cameron | 455/414 |
| 6,038,451 A | * | 3/2000 | Syed et al. | 455/445 |
| 6,058,309 A | * | 5/2000 | Huang et al. | 455/433 |
| 6,138,007 A | * | 10/2000 | Bharatia | 455/414 |

* cited by examiner

Primary Examiner—Thanh Cong Le
Assistant Examiner—Tuan Tran
(74) Attorney, Agent, or Firm—Cha & Reiter

(57) ABSTRACT

A method for performing the network direct system selection (NDSS) of a mobile station (MS) in a cellular communications system that includes the steps of: making a base station (BS) to include a dialed phone number designated for the NDSS in a CM SERVICE REQUEST message being transferred from the MS to a first MSC; making the first MSC to transmit a NDSS FEATURE REQUEST INVOKE message of the MS to the HLR upon confirming that the dialed phone number corresponds to the NDSS; making the first MSC to transmit a FEATURE REQUEST INVOKE CONFIRMATION message to the MS via the BS; making the HLR to transmit a QUALIFICATION DIRECTIVE message containing a service re-direction information to a first VLR coupled to the first MSC when the FEATURE REQUEST INVOKE message is accepted by the HLR; making the first VLR to confirm whether the QUALIFICATION DIRECTIVE message includes the service re-direction information; making the first VLR to transmit a SERVICE RE-DIRECTION message, consisting of the service re-direction information and a command to request the MS to report the return cause information when the NDSS failure occurs, to the MS; and, registering the location of the MS in a second VLR of a second MSC as directed by the SERVICE RE-DIRECTION message.

24 Claims, 8 Drawing Sheets

METHOD FOR MAKING NETWORK DIRECT SYSTEM SELECTION IN A CELLULAR COMMUNICATION SYSTEM

CLAIM OF PRIORITY

This application makes reference to, incorporates the same herein, and claims all benefits accruing under 35 U.S.C. Section 119 from an application for METHOD FOR MAKING NETWORK DIRECT SYSTEM SELECTION IN A CELLULAR COMMUNICATION SYSTEM filed earlier in the Korean Industrial Property Office on May 13, 1999 and there duly assigned Serial No. 17146/1999.

BACKGROUND OF THE INVENTION

1. Field of the Invention

The present invention relates to a cellular mobile communications system, and more particularly, a method for directly connecting a mobile station (MS) in communication with a mobile switching center (MSC) from one network to an MSC in another network.

2. Description of the Related Art

In a cellular mobile communication system, a service area is divided into a plurality of cells, each with a base station system (BS) therein. The base stations are controlled by a mobile switching center (MSC) to enable the MS to make voice or data communication while roaming from one cell to another. With reference to FIG. 1, there is illustrated a conventional cellular communications system, which includes a mobile station (MS) 10 in communication with a base station (BS) 20, and an MSC 30 coupled to a plurality of base stations, a PSTN Public Switched Telephone Network (PSTN) 60, and another MSC 40. The MSC coupled to the plurality of base stations (BSs) may be defined as one network.

The cellular network, as shown in FIG. 1, further includes a Home Location Register (HLR), which is a database maintaining all subscriber information, e.g., user profiles, current location information, International Mobile Subscriber Identity (IMSI) numbers, and other administrative information. The HLR 50 can service multiple MSCs, as shown in FIG. 1. A Visitor Location Register (VLR) 35 coupled to the MSC 30 is a database containing information about all MSs currently located within the MSC 30/VLR 35 area. Thus, the MSC establishes a call connection upon receiving a call request from the user of an MS, by accessing the HLR 50 and VLR 35/45 for the requisite identification information of the MSs registered in the network. If an MS 20 roams into a new MSC 40/VLR 45 area, the VLR 45 connected to the MSC 40 will request data about that MS 20 from the HLR 50 database. Accordingly, if the user of the MS 20 wishes to make a call, the local VLR 45 will have the requisite identification information. In the aforedescribed manner when the MS requests the call set-up or the location registration, the MS 30/40 first searches the VLR 35 or 45, then the HLR 50 retrieves various subscriber information of the MS.

In such mobile communications network, the HLR 50 can selectively elect one of the MSCs 30 and 40 to be connected to the MS, depending on the type of service requested by the MS. This is known as the Network Direct System Selection (NDSS), used to provide a specific service that is requested by the MS. For example, if an MS in communication with an MSC requests the Internet service but the MSC is not equipped with the packet data service capability, the HLR having the requisite information can determine another MSC with the Internet service capability to be connected to the MS. The operation of NDSS involves transmitting NDSS signaling messages and processing the message through the network (BS, MSC, HLR, VLR, etc.) which enables the MS to roam between different networks to receive various services or the optimal route. This type of NDSS operation is usually performed when the MS requests the registration of an additional function (e.g., voice message service, Internet service, call forwarding service, etc.), the location registration, or the call transmission.

The information regarding the current location of the MS is received in the CM SERVICE REQUEST message. Thus, when an MS in communication with the BS transmits the CM SERVICE REQUEST message with an NDSS code to request a certain feature/service, the VLR of the MSC relays this message to the HLR. The same message is relayed when the MS transmits the LOCATION UPDATE REQUEST message for registering the location of the MS, or when the MS transmits the CM SERVICE REQUEST message for requesting a call set-up as requested by the MS. Thereafter, the HLR confirms the NDSS code of the MS and determines the new MSC for providing the service as indicated in the NDSS code, then transmits the QUALIFICATION DIRECTIVE message or the REGISTRATION NOTIFICATION RETURN message back to the VLR of the MSC. Then, the MSC transmits the SERVICE RE-DIRECTION message to the MS via the BS to register the MS in the new MSC area or request the new MSC to generate a call. The address of the new MSC area is represented by the ID information included in the SERVICE RE-DIRECTION message.

However, in the above conventional NDSS operation, there are areas that need to be addressed to improve the communication efficiency. First, there is no means for the user of the MS to know whether the HLR has successfully registered the MS with a specific service as requested by the MS. For example, if the MS requests the Internet service or the voice mailing service, the user is not notified of whether the MS has been provided with the voice mailing service in the current the NDSS operation. Also, there is no protocol or set method for the VLR to transmit the QUALIFICATION DIRECTIVE message with the SERVICE RE-DIRECTION message therein from the HLR to the MS. Moreover, when performing the location registration through the NDSS operation, the procedures for transmitting the LOCATION UPDATE REQUEST from the MS to the MSC and for exchanging the REGISTRATION NOTIFICATION RETURN message between the MSC and the HLR are not defined by the TSB-80 of A-Interface in the present EIA/TIA North America CDMA Communications Standard. Furthermore, when the MS, which is already registered in the VLR, requires a call generation and transmits an NDSS code requesting a specific service, the VLR has no means to determine whether the MS is registered for the specific service. Hence, the VLR may establish a call-set up without consulting with the HLR and fails to provide the appropriate MSC that has the capability to provide the requested service.

SUMMARY OF THE INVENTION

It is an object of the present invention to provide a method for performing the Network Direct Select System (NDSS) in a communication system whenever the MS transmits an NDSS code requesting a specific feature/service from the system.

It is another object of the present invention to provide a method for performing the Network Direct Select System (NDSS) in a communication system whenever the MS executes the location registration.

It is a further object of the present invention to provide a method for performing the Network Direct Select System (NDSS) in a communication system whenever the MS attempts to establish a call set-up.

According to one embodiment of the present invention, a method for performing the NDSS operation of an MS in a cellular communications system includes steps of: inserting, by a BS, a dialed phone number with an NDSS code in a CM SERVICE REQUEST message to be transferred to a first MSC; transmitting, by the first MSC, an NDSS FEATURE REQUEST INVOKE message of the MS to the HLR after confirming the dialed phone number of the NDSS; transmitting, by the first MSC, a FEATURE REQUEST INVOKE CONFIRMATION message to the MS via the BS; upon receiving the FEATURE REQUEST INVOKE message from the first MSC, determining, by the HLR, whether a second MSC needs to be designated for providing the requested service; transmitting, by the HLR, a QUALIFICATION DIRECTIVE message to a first VLR of the first MSC and including a service re-direction information in the QUALIFICATION DIRECTIVE message if is determined to require the second MSC service; determining, by the first VLR, whether the QUALIFICATION DIRECTIVE message contains the service re-direction information; transmitting, by the first VLR, the service re-direction message including the service re-direction information and transmitting a command message to request the MS to report a connection failure to the second MSC; and, registering the location of the MS in a second VLR of the second MSC as directed by the service re-direction message.

According to another embodiment of the present invention, a method for performing the NDSS operation of an MS in a cellular communications system includes the steps of: transmitting, by the MS via a base station, a LOCATION REVISION REQUEST message including the return cause information of a previous NDSS operation failure to a first VLR of a first MSC; storing, by the first VLR, the information of LOCATION REVISION REQUEST message from the MS and transmitting a LOCATION REGISTRATION NOTIFICATION message including the return cause information to the HLR; revising, by the HLR, the location information of the MS and transmitting a LOCATION REGISTRATION NOTIFICATION RETURN message including service re-direction information after determining whether the LOCATION REGISTRATION NOTIFICATION message includes the return cause information and whether the MS requires the assignment of a new MSC; if the location REGISTRATION NOTIFICATION RETURN message includes the service re-direction information, transmitting, by the first VLR, a SERVICE RE-DIRECTION message including the service re-direction information and a command message to request the MS to report when the connection to the new MSC fails; and, registering the location of the MS in the second VLR of a second MSC as directed by the service re-direction message.

According to another embodiment of the present invention, a method for performing the NDSS operation of an MS in a cellular communications system includes the steps of: transmitting a CM SERVICE REQUEST message including a phone number dialed by the MS to a first MSC via a BS; searching, by the first MSC, the subscriber information of the MS from a first VLR; transmitting a LOCATION REGISTRATION NOTIFICATION message including the NDSS feature request invoke information of the MS from the first VLR to the HLR, if the subscriber information of the MS is stored in the VLR, or if the MS is registered with the NDSS code; transmitting a location REGISTRATION NOTIFICATION RETURN message including the subscriber information with service re-direction information from the HLR to the first VLR if the MS requires a new MSC; determining, by the first MSC, whether the subscriber information stored in the first VLR includes the service re-direction information; if the location REGISTRATION NOTIFICATION RETURN message includes the service re-direction information, transmitting a service re-direction message including the service re-direction information and a command message to request the MS to report if the connection to the new MSC fails; terminating the connection with the first MSC with the MS; and, initiating, by the MS, the generation of a call to a second MSC as directed by the service re-direction message.

As explain above, there are three embodiments utilizing the NDSS operation to perform a call set-up between the originating MSC and the terminating MSC. The first embodiment includes the event that the MS transmits a specific feature request; the second embodiment includes the event that the MS executes the location registration; and, the third embodiment includes the event that the MS originates a call. To this end, the HLR transmits the service re-direction information including the ID of the new MSC to the VLR of the originating MSC when the MS requires the NDSS operation. The originating MSC transmits a SERVICE RE-DIRECTION message including the service re-direction information to the MS so as to request the new MSC to execute the location registration or call generation.

According to the embodiment of the present invention, the CM SERVICE REQUEST message, transmitted from the base station to the MSC, for call generation and the LOCATION REVISION REQUEST message, transmitted from the MS for location registration, include the return cause information. The return cause information includes information relating to the failure cause of the previous service re-direction attempt. The return cause information, as set forth under the MAP interface of IS-735 standard, includes information indicating that the new MSC is not detected and that the MS does not support the NDSS operation. Accordingly, the MSC and the HLR may take proper action, such as re-attempting the call request, upon detecting the failure of the MS for the NDSS via the return cause information from the MS.

In the embodiment, in order to receive the return cause information from the MS, the MSC includes a parameter for commanding the MS to report the cause of the NDSS failure to the new network in the service re-direction message that is transferred to the MS. Thereafter, the MS includes the return cause information in the CM SERVICE REQUEST message or the location revision request message that is transferred to the MSC so that the MSC can transfer the return cause information to the HLR.

In the embodiment of the present invention, the subscriber information of the MS further includes the information indicating whether it is registered or activated for the NDSS. Thus, upon detecting the subscriber information of the MS requesting a call generation which is also activated for the NDSS, the VLR requests the subscriber information from the HLR to determine whether the MS requires a new assignment of the MSC. Thus, the present invention provides the methods for checking the NDSS of the MS by the HLR in three embodiments.

The foregoing and other objects, features, and advantages of the invention will be apparent from the following, more detailed description of preferred embodiments as illustrated in the accompanying drawings in which reference characters refer to the same parts throughout the various views. The drawings are not necessarily to scale, the emphasis instead placed upon illustrating the principles of the invention.

BRIEF DESCRIPTION OF THE ATTACHED DRAWINGS

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details. For the purpose of clarity, detailed descriptions of well-known devices, circuits, and methods are omitted so as not to obscure the description of the present invention with unnecessary detail.

Figure 1:
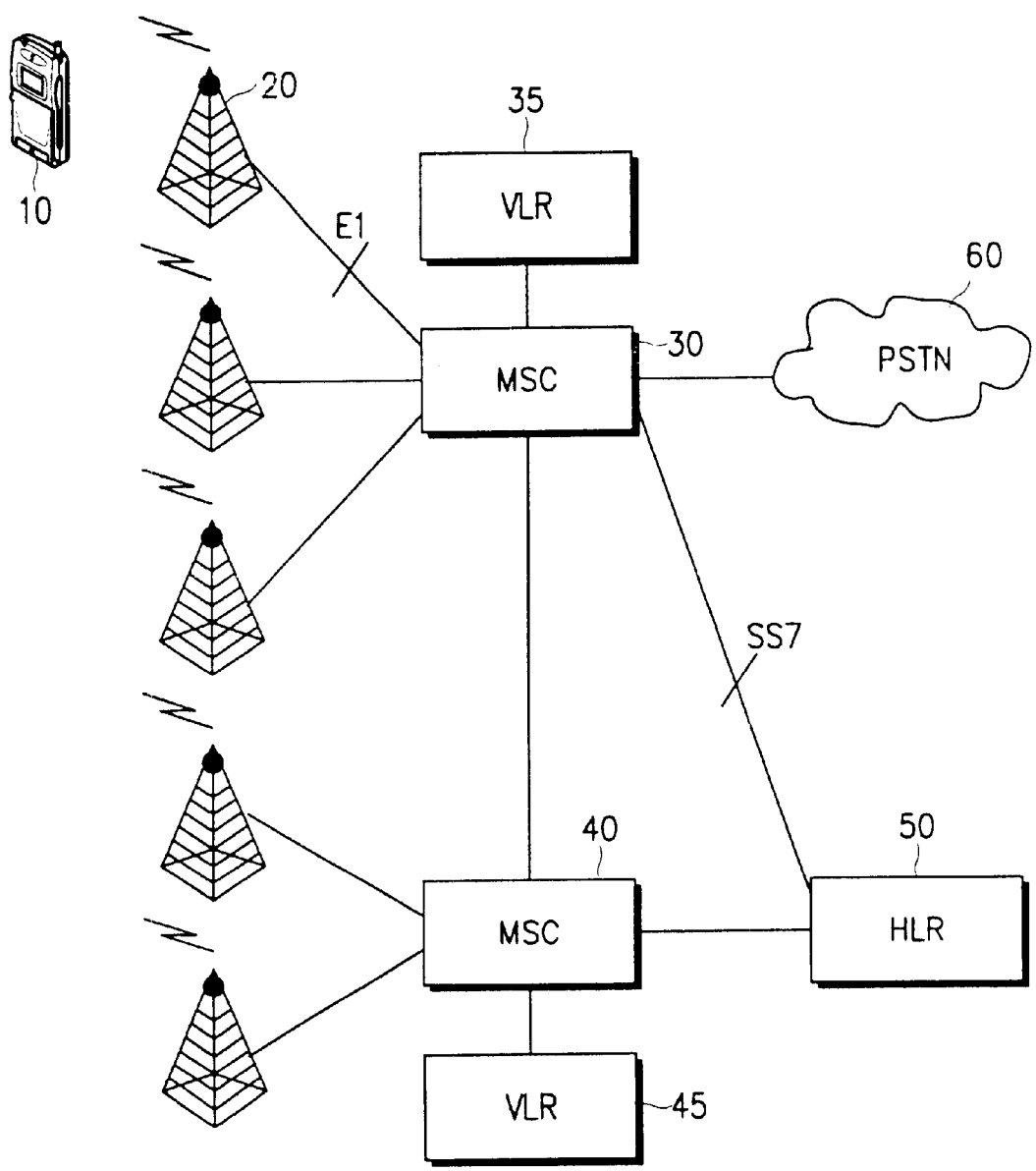
FIG. 1 is a schematic diagram for illustrating the typical structure of a cellular communications system.
Figure 2:
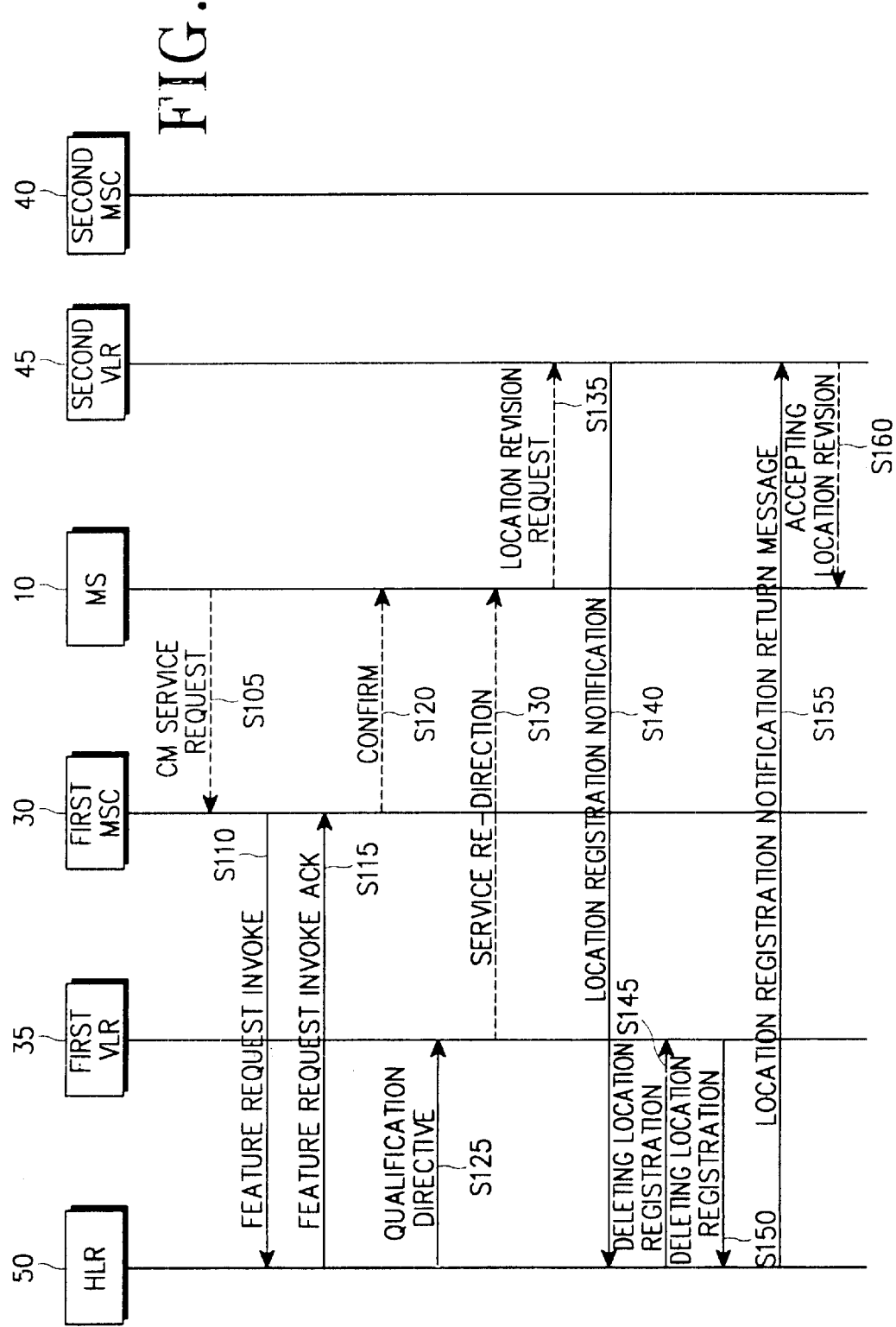
FIG. 2 is a schematic diagram for illustrating the flow of performing the NDSS based on the feature request invoke message according to the present invention.

According to the first embodiment of the present invention with reference to FIG. 2, the network direct system selection (NDSS) function may be initiated by the MS upon dialing a particular phone number or dialing a feature code defined for the NDSS. That is, each feature code represents various different services, i.e., the voice message service, the Internet service, the call forwarding service, etc. In step S105, when dialing the feature code through the MS 10, the BS includes the feature code in the CM SERVICE REQUEST message to be transferred to the first MSC 30, which is presently serving the area where the MS 10 is located. Upon confirming that the called phone number of the MS is intended for the NDSS to request a specific feature, the first MSC 30 transmits the FEATURE REQUEST INVOKE message to the HLR 40 in step S110. Upon storing the information of the FEATURE REQUEST INVOKE message, the HLR 50 transmits an acknowledgment message back to the first MSC 30 in step S115. Here, the HLR 50 determines whether the MS 10 is registered for the requested feature service and requires the NDSS to select a new MSC equipped to provide the requested feature service, then notifies the outcome of this determination to the first MSC. Then, the first MSC 30 sends a CONFIRMATION message to the MS 10 via the BS in step S120, so that the MS can generate a predetermined tone or visual message in the display unit of the MS to notify the user that the MS requires the NDSS. Thus, if the FEATURE REQUEST INVOKE message is successfully received by the HLR 50 and a determination is made to actuate the NDSS, the HLR 50 transmits the QUALIFICATION DIRECTIVE message to the first VLR 35 via first MSC 30, to notify the revised information including the identification (ID) of the new MSC, which represents the service re-direction information, in step S125.

In step S130, the first VLR 35 determines whether the QUALIFICATION DIRECTIVE message contains the service re-direction information. To this end, the VLR 35 determines whether the ID of the MSC contained in the QUALIFICATION DIRECTIVE message is same as that of the first MSC 30. If not the same, the QUALIFICATION DIRECTIVE message is determined to have the service re-direction information.

If the QUALIFICATION DIRECTIVE message contains the service re-direction information, the first VLR 35 transfers the SERVICE RE-DIRECTION message including the service re-direction information to the MS 10 via the BS and the command message for the MS to report the cause of failure in the event that the connection to the new MSC fails. However, if the QUALIFICATION DIRECTIVE message contains the service re-direction information and the MS 10 is presently in communication with the first MSC 30, the first MSC 30 deletes the information of the MS 10 presently stored in the first VLR 35. The disconnection is made so as to enable the MS 10 connect to the new MSC indicated by the service re-direction information. In an other embodiment, when the QUALIFICATION DIRECTIVE message contains the service re-direction information and the MS 10 in communication with the first MSC 30, the first MSC 30 stores the service re-direction information into the first VLR 35 until the MS changes into the idle state. If the MS comes into the idle state, the first MSC 30 composes the service re-direction message using the service re-direction information stored in the first VLR 35, then transfers the service re-direction message to the MS via the BS.

Upon receiving the service re-direction message, in step S135, the MS 10 requests the location registration from the second VLR 45 of the second MSC 40, which is designated by the ID of the newly preferred MSC in the service re-direction message, so that the second VLR 45 notifies the HLR 50 of the location registration by the MS in step 140. Thereafter, the HLR 50 deletes the location registration information of the MS 10 stored in the first VLR 35 of the first MSC 30 in steps S145 and S150, then notifies the second VLR 45 the completion of the location registration in step S155. Finally, the second VLR 45 notifies the MS 10 of the acceptance of the location revision through the BS in step S160.

Figure 3:
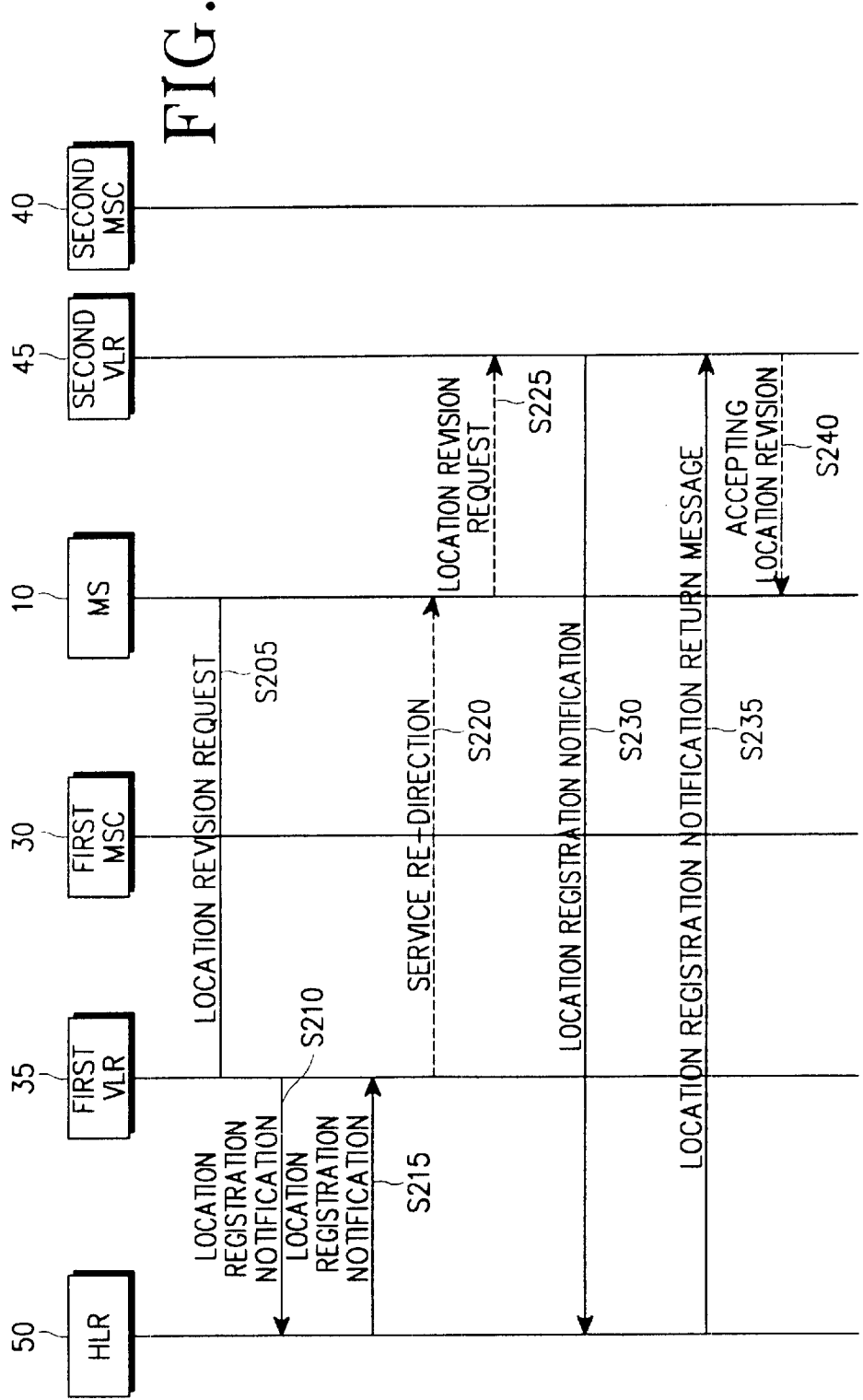
FIG. 3 is a schematic diagram for illustrating the flow of performing the NDSS based on the location registration according to the present invention.

According to the second embodiment of the present invention with reference to FIG. 3, when the NDSS operation is actuated based on the location registration process, the MS periodically notifies its location to the MSC, which is in communication with the MS, for the location registration purposes, so that the MSC can properly select the proper BS in response to the location of the MS. In the event that the MS fails to roam into a new MSC through the NDSS, the MS transmits the return cause information and re-attempts to register its location to the previous MSC. Namely, the MS 10 re-transmits the LOCATION REVISION REQUEST message containing the return cause information to the first VLR 35 of the first MSC 30 via BS, in step S205. The step of re-transmitting the LOCATION REVISION REQUEST message back to the previous MSC is triggered because the MSC is designed to command the MS to report if the NDSS connection to the new MSC fails, and, if unsuccessful, command the MS to re-attempt the location registration process. Hence, the return cause information represents whether the network roaming of the MS has been successfully achieved in the previous attempt in response to the prior service re-direction attempt.

In step S210, the first MSC 30 stores the information of the MS 10 into the first VLR 35, transmits the LOCATION REGISTRATION NOTIFICATION message to the HLR 50. Here, the LOCATION REGISTRATION NOTIFICATION message includes the information on the return cause information from the prior attempt from the MS 10. Upon confirming that the LOCATION REGISTRATION NOTIFICATION message includes the return cause information from the previous attempt, the HLR 50 commands the first MSC 30 to accept the location registration request of the MS 10, instead of the second MSC 40. In another embodiment, at the request of the operator, the HLR 50 can command the first MSC to treat the location registration request from the MS 10 as failure in step S205 in the event that the LOCATION REGISTRATION NOTIFICATION message includes the prior return cause information.

The HLR 50 revises the location information of the MS and determines whether the MS requires the NDSS. If it requires the NDSS, the HLR 50 includes the service re-direction information in the LOCATION REGISTRATION NOTIFICATION RETURN message to be transmitted back to the VLR 35 in step S215. The service re-direction information includes the ID of the new MSC 40 to which the MS 10 is to attempt the location registration. Thus, in step S220, the first VLR 35 transfers the SERVICE RE-DIRECTION, including the service re-direction information, to request the new MSC for the location registration and commands the MS to report the connection failure to the new MSC to the MS 10 via the BS.

In step S225, upon detecting the ID of the MSC included in the service re-direction message, the MS 10 transmits the location registration request to the second VLR 45 of the second MSC 40. Then, the second VLR 45 notifies the HLR 50 of the location registration in step S230. Upon deleting the location registration information of the MS 10 that is previously stored in the first VLR of the first MSC, the HLR 50 notifies the second MSC 40 the completion of the location registration in step S235. Then, in step S240, the second MSC 40 stores the information of the MS 10 into the second VLR 45 and notifies the MS 10 that the location revision is accepted by the second MSC 40 through the BS.

Figure 4:
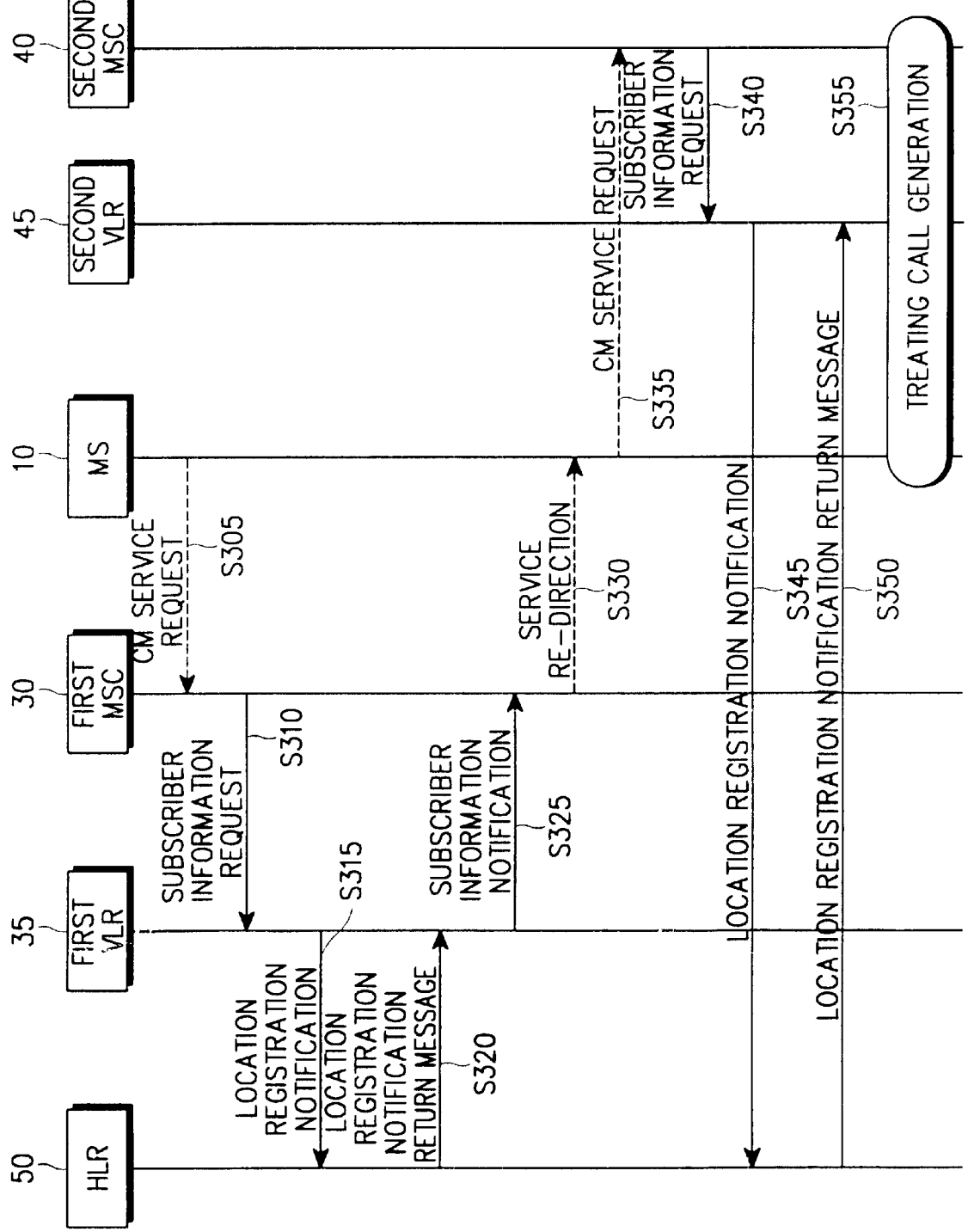
FIG. 4 is a schematic diagram for illustrating the flow of performing the NDSS based on the call generation according to the present invention.

According to the third embodiment of the present invention with reference to FIG. 4, when the NDSS operation is initiated based on the call generation by the MS, the BS transmits the CM SERVICE REQUEST message including the phone number dialed by the MS 10 to the first MSC 30, in step S305. The CM SERVICE REQUEST message may contain the return cause information relating the cause of the NDSS failure from the previous service re-direction attempt. In step S310, the first MSC 30 requests the subscriber information of the MS 10 from the first VLR 35. In the prior art, if the first VLR 35 already includes the subscriber information of the MS 10, it may proceed with the call generation without requesting the HLR 50 for further subscriber information. However, this makes it impossible for the HLR 40 to determine whether the MS 10 requires the NDSS, thus the HLR can not actuate the NDSS when required. In order to prevent this, the subscriber information of the MS according to the present invention includes the NDSS active information representing whether the MS is registered for various features.

At the request of the first MSC 30, the first VLR 35 searches the subscriber information of the MS 10 to determine whether the MS is registered for the NDSS. If there were the subscriber information and the NDSS information were not activated, the VLR transfers the subscriber information to the MSC 30 to establish the call set-up with the MS 10. However, if the first VLR 35 does not store the subscriber information of the MS or that the NDSS of the MS 10 is not activated, the first VLR 35 transmits the LOCATION REGISTRATION NOTIFICATION message to the HLR 50 to request the subscriber information of the MS 10. Meanwhile, if the return cause information relating the prior NDSS attempt is received from the MS 10, the first VLR 35 includes the return cause information in the LOCATION REGISTRATION NOTIFICATION message. Then, upon confirming that the LOCATION REGISTRATION NOTIFICATION message contains the return cause information, the HLR 50 commands the first MSC 30 to process the call generation to set-up the call. Alternatively, at the request of the operator, the HLR 50 can treat the call generation request of the MS 10 as failure.

However, if the location registration notification message does not contain the return cause information, the HLR 50 proceeds with the normal NDSS. In order to proceed a with the normal NDSS, the HLR 50 determines whether the MS 10 requires the NDSS. That is, the HLR 50 determines whether the MS needs to be relocated to a different MSC which can fully provide various features, such as the Internet service, the voice message service, and other services registered to the MS. If the MS 10 requires its location to be registered in the second MSC 40 through the NDSS process, the HLR 50 transmits, in step S320, the subscriber information of the MS including the service re-direction information to the first VLR 35 through the LOCATION REGISTRATION NOTIFICATION RETURN message. Here, the service re-direction information includes the ID of the new MSC.

In step S325, the first VLR 35 notifies the first MSC 30 of the subscriber information received from the HLR 50. Upon detecting that the ID of the MSC contained in the subscriber information is not same as its own ID, the first MSC 30 determines that the subscriber information includes the service re-direction information. If the subscriber information does not contain the service re-direction information, the first MSC 30 establishes the call set-up to the MS 10. However, if the subscriber information includes the service re-direction information, the first MSC 30 transfers, in step S330, the service re-direction message to the MS 10 via the BS and requests the MS to report if the connection to the new MSC fails.

In step S335, upon detecting the ID of the new MSC contained in the service re-direction message, the MS 10 sends the CM SERVICE REQUEST message to the second MSC 40 indicated by the ID information in the service re-direction message. Then, the second MSC 40 requests the subscriber information from the second VLR 45 in step S340, transmits the LOCATION REGISTRATION NOTIFICATION message to the HLR 40 to notify the subscriber information of the MS in step S345. Upon deleting the location registration information of the MS 10 from the first VLR of the first MSC, the HLR 50 transmits, in step S350, the location REGISTRATION NOTIFICATION RETURN message containing the subscriber information to the second VLR 45. Thereafter, in step S355, the second MSC 40 treats the call from the MS 10 according to the subscriber information registered in the second VLR 45.

Figure 5:
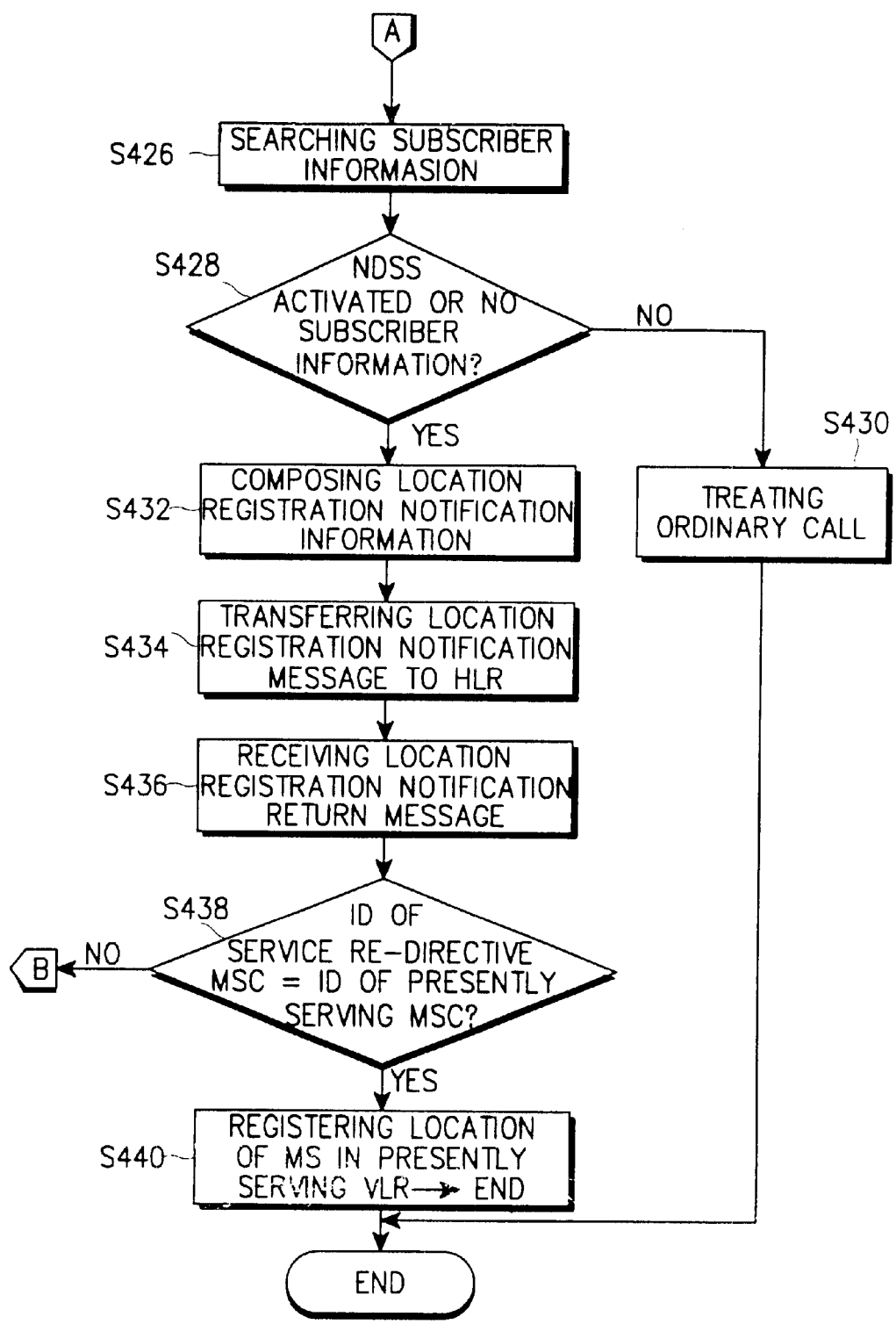
FIG. 5 is a flow chart for illustrating the process of performing the NDSS by the MSC at the request of a call generation according to the present invention.
Figure 5A:
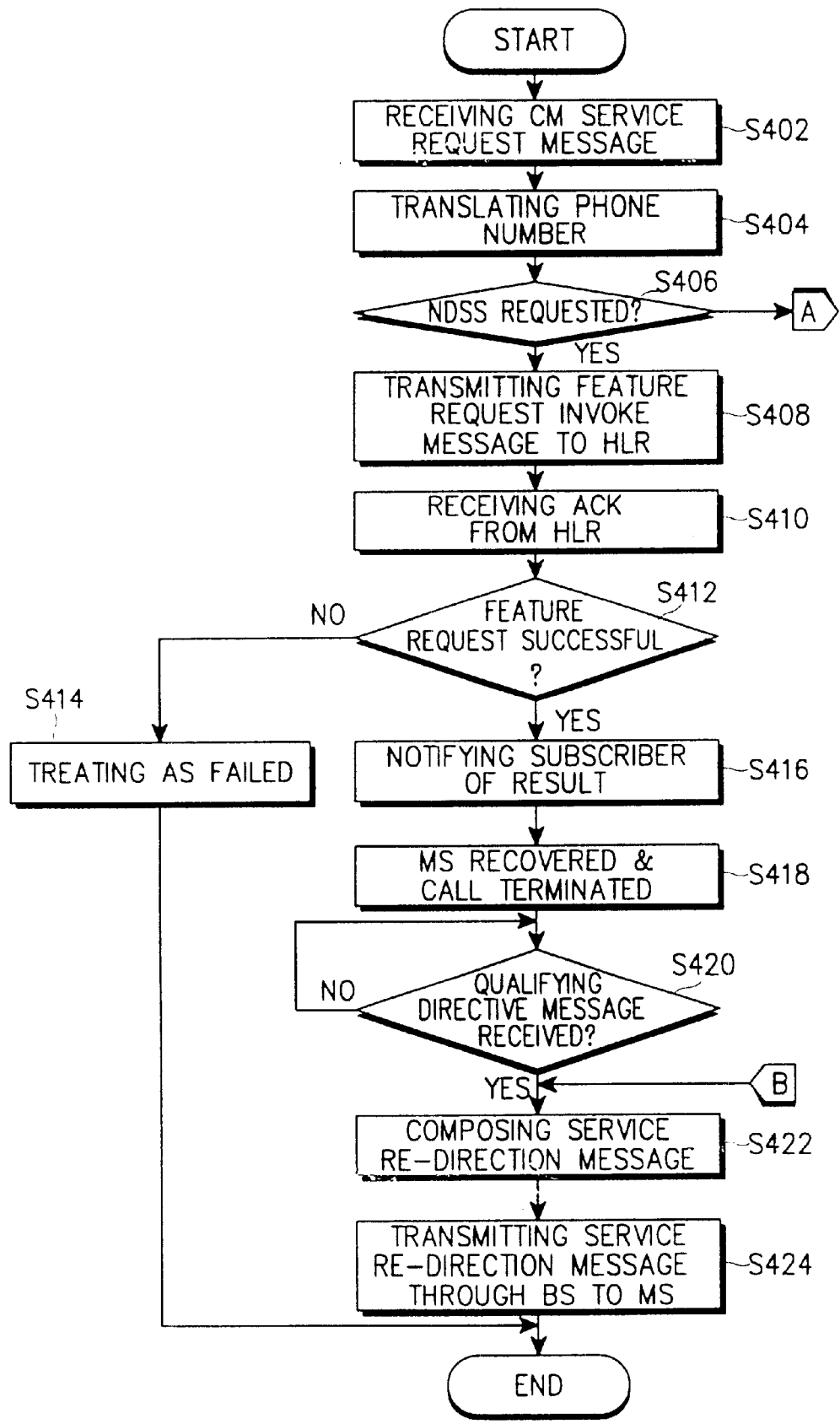

In the following description, a method for performing the NDSS according to the CM SERVICE REQUEST message of the first and the third embodiments is described with reference to FIG. 5. When an MS dials a phone number requesting a call set-up or requesting a specific feature from the system, the BS in communication with the MS includes the phone number in the CM SERVICE REQUEST message to be transferred to the serving MSC. Upon receiving the CM SERVICE REQUEST message from the MS via the BS in step S402, the serving MSC translates the phone number contained in the CM SERVICE REQUEST message, in step S404, to determine in step S406 whether the phone number represents a request for an ordinary call set-up or a specific feature requiring the NDSS.

If the phone number is for the NDSS, the MSC transmits the FEATURE REQUEST INVOKE message to the HLR in step S408. The MSC, in step S412, determines that the feature request is successfully transmitted to the HLR if an acknowledging message ACK is received, in step S410, from the HLR. The ACK message can include the information representing that the MS is registered in the NDSS network, and requires the NDSS operation. However, if the attempt to transmit the feature request message fails, the MSC considers the NDSS for the MS as unsuccessful in step S414 and notifies the user of the MS of such failure by sending a predetermined tone or message to MS, then terminates the call.

If the feature request message is successfully transmitted, the MSC connects a call set-up with the MS in step S416 and notifies the user of the acceptance of the NDSS by sending a predetermined tone or message.

As described above, the MSC generates the tone/message at the moment of succeeding the transmission of the feature request message, instead of being connected to a new MSC so that the subscriber may be informed of the possible NDSS before the actual roaming to the new MSC. The reason for generating the tone/message after the successful transmission of the feature request message is that, if the service re-direction information contained in the QUALIFICATION DIRECTIVE message delivered from the HLR to the VLR includes the command for the MS to report the possible failure of the service re-direction, the MSC need to not take any subsequent action after the failure of the NDSS other than having the MS to request the location registration again to the MSC.

Thus, after receiving the acknowledgment message that the MS is registered in the NDSS network, in step S418, the MSC terminates the call with the MS to connect to the new MSC and notifies the VLR that the MS is recovered into an idle state. Then, in step S420, the VLR determines whether the HLR has sent the QUALIFICATION DIRECTIVE message containing the service re-direction information for the NDSS. Upon detecting the QUALIFICATION DIRECTIVE message, in step S422, the VLR composes the service re-direction message based on the service re-direction information contained in the QUALIFICATION DIRECTIVE message, and then transmits the service re-direction message to the MS via the BS in step S424. The VLR also includes information in the service re-direction message commanding the MS to report if it fails to be connected to the new MSC. Thereafter, the MS requests the location registration from the new MSC as designated by the service re-direction message received therein. However, if the HLR transfers the QUALIFICATION DIRECTIVE message to the VLR before the original MSC terminates the call connection with the MS, the VLR stores the QUALIFICATION DIRECTIVE message until the MS changes into an idle state. That is, the original MSC has to be disconnected with the MS before being connected to the new MSC assigned by HLR, and the transition period after the disconnection with the original MSC and before the connection to the new MSC is considered an idle state.

Figure 6:
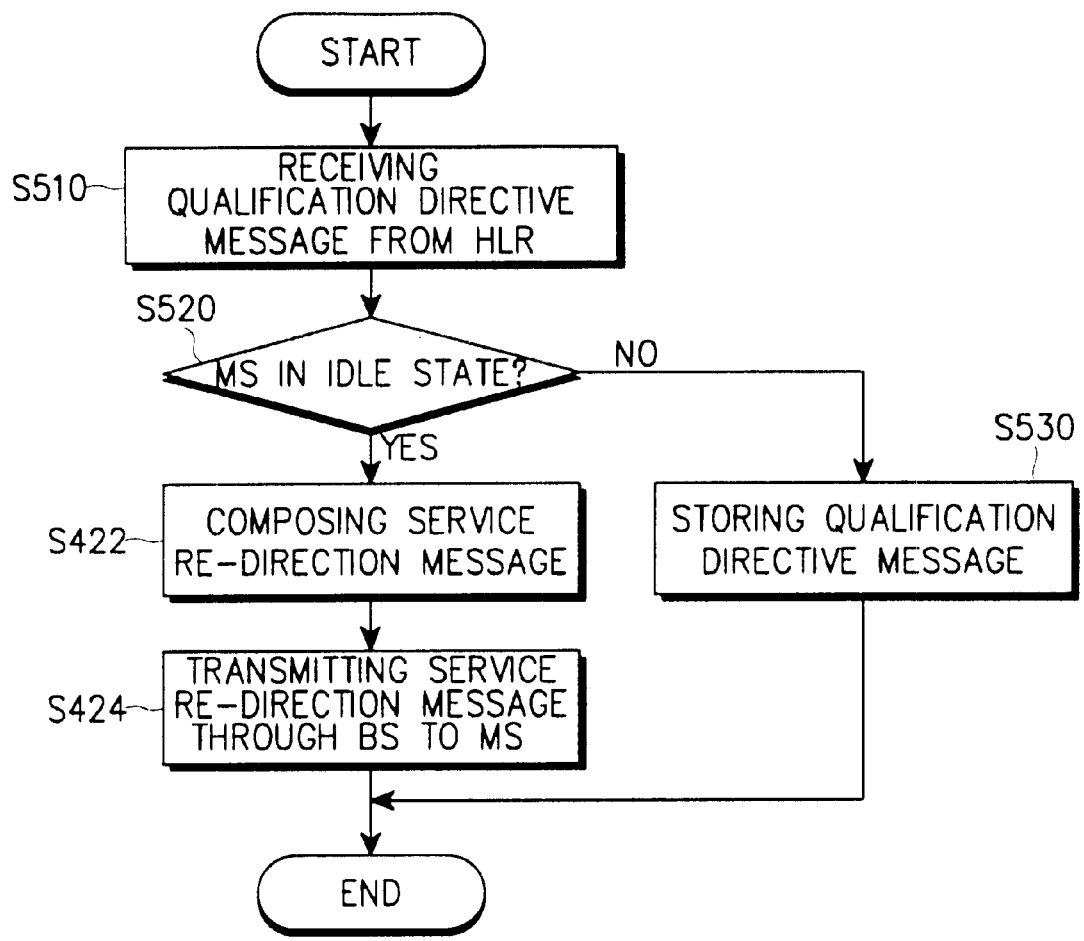
FIG. 6 is a flow chart for illustrating the process of treating the service re-direction message according to the present invention; and, FIG. 7 is a flow chart for illustrating the process of performing the NDSS by the MSC based on the location registration according to the present invention.

Herein, a more detailed description of the steps (S422 and S424) for processing the service re-direction message is explained with reference to FIG. 6. When the HLR transfers in step S510 the QUALIFICATION DIRECTIVE message to the VLR before the original MSC terminates the call with the MS, the VLR determines in step S520 whether the MS is in the idle state. If the MS is still in communication with the original MSC, the VLR stores in step S530 the service re-direction information of the QUALIFICATION DIRECTIVE message so that it can be transferred later when the MS changes to an idle state. However, if the MS is in the idle state, the VLR composes in step S422 the service re-direction message based on the service re-direction information contained in the QUALIFICATION DIRECTIVE message, then transfers the service re-direction message to the MS through the BS, in step S424. Hence, the MS can request the call generation from the new MSC as indicated in the service re-direction message.

Meanwhile, if the received phone number is not for the NDSS but intended as an ordinary call set-up in step S406, the MSC treats the call as an ordinary call. To this end, the MSC searches the subscriber information of the MS from the VLR. In step S428, the VLR searches the subscriber information to determine whether the MS is activated or registered for the NDSS. If there were subscriber information and the NDSS information were not activated, the VLR transfers in step S430 the subscriber information to the MSC to establish the call set-up with the MS. However, if there is no subscriber information, or if the NDSS information is activated with the subscriber information, the VLR composes in step S432 the LOCATION REGISTRATION NOTIFICATION message to be transferred to the HLR in step S434. Here, the VLR includes the NDSS feature request information from the MS in the LOCATION REGISTRATION NOTIFICAITON message.

Upon receiving the LOCATION REGISTRATION NOTIFICAITON message, the HLR determines whether the MS requires the NDSS in order to select a new MSC for the NDSS. If the MS requires the NDSS, the HLR includes the ID of the new MSC in the location REGISTRATION NOTIFICATION RETURN message, which is an acknowledging message of the REGISTRATION NOTIFICATION message to be transferred to the VLR. If the MS does not require the NDSS, the HLR includes the ID of the presently serving MSC in the REGISTRATION NOTIFICATION RETURN message. Upon receiving the LOCATION REGISTRATION NOTIFICATION RETURN message from the HLR in step S436, the VLR determines in step S438 whether the MSC ID of the service re-direction received therein contains the same ID as that of the presently serving MSC. If so, the MSC registers the subscriber information of the MS in the VLR in step S440 because the LOCATION REGISTRATION RETURN message does not contain the service re-direction information.

Alternatively, if the ID of the MSC in the service re-direction is different from that of the presently serving MSC in step S422, the VLR composes the service re-direction message using the service re-direction information (ID of the new MSC) contained in the REGISTRATION NOTIFICATION RETURN message to be transferred to the MS through the BS in step S424. In addition, the VLR includes the command for the MS to report the failure source to connect to the new MSC in the service re-direction message. Thereafter, the MS requests the call generation from the new MSC as directed in the service re-direction message.

Figure 7:
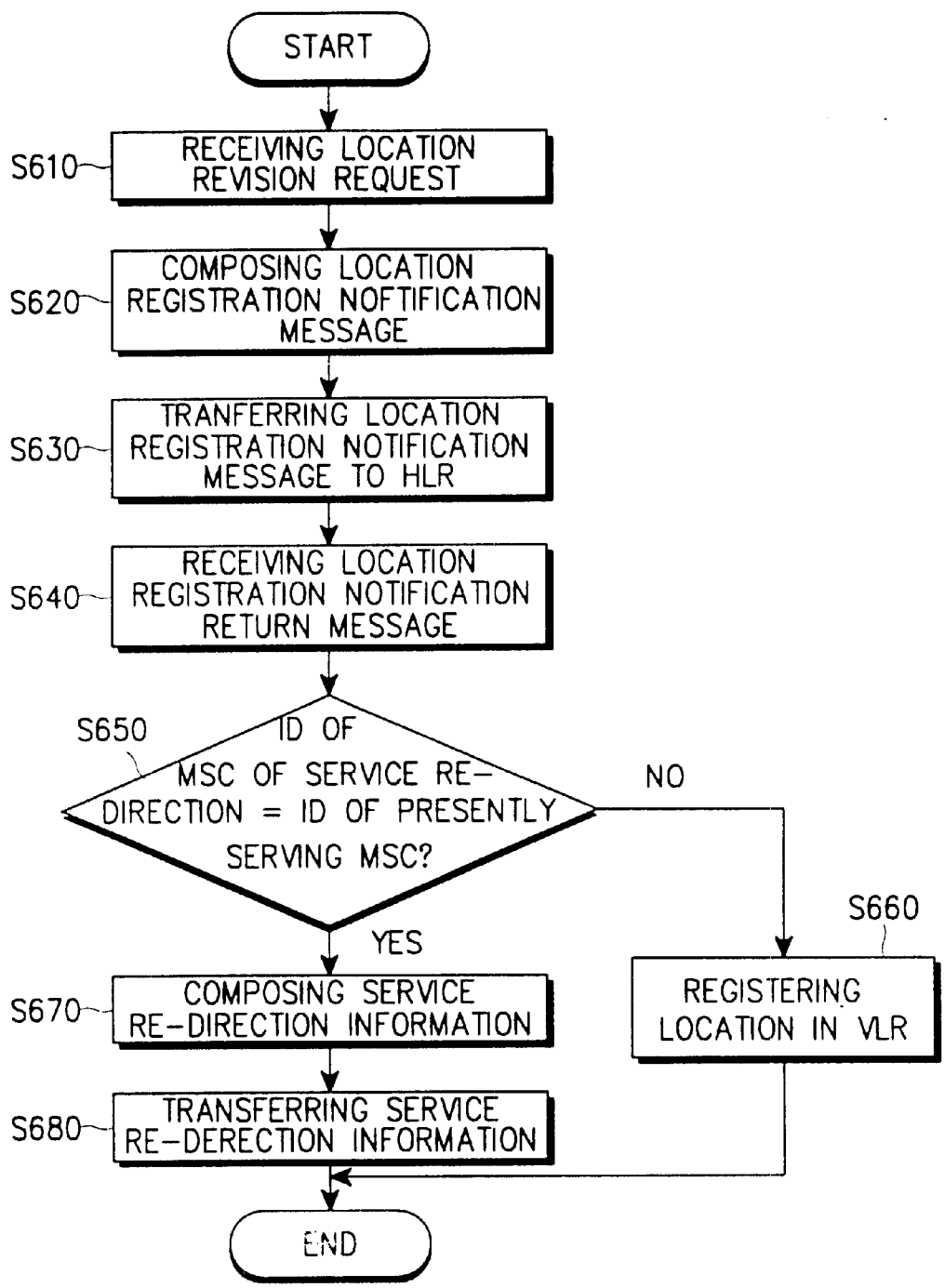

Herein, a detailed description of performing the NDSS according to the second embodiment is explained with reference to FIG. 7. When the MS roams into a certain MSC, it transfers the LOCATION REVISION REQUEST message to the VLR through the BS to inform its location. In this case, the LOCATION REVISION REQUEST message may include the return cause information from a previous service re-direction attempt. Upon receiving the LOCATION REVISION message in step S610, the VLR composes the location registration notification message in step S620 to be transferred to the HLR in step S630. Based on the return cause information contained in the LOCATION REGISTRATION NOTIFICATION message, the HLR determines whether the previous service re-direction attempt was a failure. If so, the HLR commands the presently serving MSC to register the location of the MS. Alternatively, at the control of the operator, the HLR can treat the LOCATION REVISION REQUEST of the MS as failure. However, if the previous service re-direction was successful, the HLR transfers the LOCATION REGISTRATION NOTIFICATION RETURN message with the ID of the new MSC for the NDSS to the VLR.

Upon receiving the LOCATION REGISTRATION NOTIFICATION RETURN message in step S640, the VLR determines in step S650 whether the ID of the new MSC contained in the service re-direction information is same as the presently serving MSC. If the new MSC ID is same as the present MSC, the VLR considers the LOCATION REGISTRATION NOTIFICATION RETURN message as not including the service re-direction information for the NDSS, then stores the information of the MS in step S660 and thereafter notifies the MS of the acceptance of the location revision request. However, if the new MSC ID is not same as the present MSC in step S650, the VLR composes in step S670 the service re-direction message based on the service re-direction information of the LOCATION REGISTRATION NOTIFICATION RETURN message to be transferred to the MS via the BS, in step S680. Thus, the MS transfers again the LOCATION REVISION REQUEST message to the new MSC as directed by the MSC ID in the service re-direction message. It should be noted that the present invention can be applied to a situation when the MS, in communication with a PCS network, attempts to connect to the IMT2000 network. In such a case, there should be an appropriate interface defined between the networks as these networks have their respective HLRs.

In sum, if there is a need for the MS to connect with a more suitable MSC, the present invention makes the HLR to provide the MS with the information of the suitable MSC using the LOCATION REGISTRATION NOTIFICATION RETURN message and the QUALIFICATION DIRECTIVE message, thus facilitating the communication services. For example, when the MS requests packet data services from a MSC that is not equipped to provide the packet data service, the HLR may command the MS to perform the NDSS to connecte to another MSC that has the packet data service capability.

While the present invention has been described in connection with specific embodiments accompanied by the attached drawings, it will be readily apparent to those skilled in the art that various changes and modifications may be made thereto without departing the gist of the present invention.

What is claimed is:

1. A method for performing the network direct system selection (NDSS) of a mobile station (MS) in a cellular communications system to connect said MS from one network to another network, comprising the steps of:
    (a) transmitting, by said MS, a CM SERVICE REQUEST to be transferred to a first mobile switching center (MSC) in said one network;
    (b) inserting, by a base station (BS), a dialed phone number intended for said NDSS to request a specific feature in said CM SERVICE REQUEST message prior to the transmission to said first MSC;
    (c) transmitting a FEATURE REQUEST INVOKE message, by said MSC, to a home location register (HLR) upon receiving said CM SERVICE REQUEST for said NDSS;
    (d) transmitting a FEATURE REQUEST INVOKE CONFIRMATION message, by said first MSC, to said MS via said BS;
    (e) upon receiving said FEATURE REQUEST INVOKE message, transmitting, by said HLR, a QUALIFICATION DIRECTIVE message that includes a service re-direction information to a first visitor location register (VLR) coupled to said first MSC;
    (f) confirming, by said first VLR, whether said QUALIFICATION DIRECTIVE message includes said service re-direction information;
    (g) transmitting, by said first VLR, a SERVICE RE-DIRECTION message to said MS via said BS, said SERVICE REDIRECTION message including said service re-direction information and a command requesting said MS to report if said MS fails to connect to a second MSC in said another network; and,
    (h) registering the location of said MS in a second VLR of said second MSC of said another network in response to said SERVICE RE-DIRECTION message.

2. The method as defined in claim 1, wherein said step (d) of transmitting said FEATURE REQUEST INVOKE CONFIRMATION message further comprising the step of generating, by said MS, a predetermined tone or visual message to notify the user of said MS of the acceptance of said NDSS FEATURE REQUEST INVOKE message by said HLR.

3. The method as defined in claim 1, wherein said step (f) of confirming whether said service re-direction information is included in said QUALIFICATION DIRECTIVE message is based on whether the identification (ID) of a MSC in said QUALIFICATION DIRECTIVE message matches the ID of said first MSC.

4. The method as defined in claim 1, wherein said step (g) of transmitting said SERVICE RE-DIRECTION message further comprising the steps of:
    determining, by said first VLR, whether said MS is in an idle state; and,
    transmitting, by said VLR, said SERVICE RE-DIRECTION message to said MS via said BS if said MS is in said idle state.

5. The method as defined in claim 1, wherein said step (g) of transmitting said SERVICE RE-DIRECTION message further comprising the steps of:
    determining, by said first VLR, whether said MS is in an idle state;

storing said SERVICE RE-DIRECTION message in said first VLR if said MS is not in said idle state; and, transmitting, by said first VLR, said SERVICE RE-DIRECTION message stored therein to said MS via said BS if said MS changes into said idle state.

6. The method as defined in claim 1, wherein said step (g) of transmitting said SERVICE RE-DIRECTION message further comprising the steps of:

determining, by the first VLR, whether said MS is in an idle state; and, deleting, by said first VLR, the subscriber information of said MS that is previously stored.

7. The method as defined in claim 1, wherein said step (h) of registering the location of said MS in said second VLR further comprising the steps of:

transmitting a LOCATION REVISION REQUEST message from said MS to said second VLR;

transmitting a LOCATION REGISTRATION NOTIFICATION message from said second VLR to said HLR and deleting the location registration information of said MS in said first VLR;

transmitting, by said HLR, a LOCATION REGISTRATION COMPLETION message to said second VLR; and, storing, by said second VLR, the location registration information of said MS and transmitting a LOCATION REVISION ACCEPTED message to said MS.

8. A method for performing the network direct system selection (NDSS) of a mobile station (MS) in a cellular communications system to register said MS in one network to another network, comprising the steps of:

(a) transmitting a LOCATION REVISION REQUEST message that includes a failure information of the previous NDSS attempt by said MS to a first visitor location to register (VLR) coupled to a first mobile switching center (MSC), via a base station (BS), in said one network;

(b) storing, by said first VLR, said prior failure information of said MS and transmitting a LOCATION REGISTRATION NOTIFICATION message that includes said prior failure information to a home location register (HLR);

(c) determining, by said HLR, whether said LOCATION REGISTRATION NOTIFICATION message includes said prior failure information and determining whether said MS requires to be registered to said another network;

(d) updating, by said HLR, the location information of said MS and transmitting a LOCATION REGISTRATION NOTIFICATION RETURN message that includes a service re-direction information if said MS requires to be registered to said another network;

(e) transmitting, by said first VLR, a SERVICE RE-DIRECTION message to said MS via said BS if said location REGISTRATION NOTIFICATION RETURN message includes said service redirection information, said SERVICE REDIRECTION message including said service re-direction information and a command requesting said MS to report if said MS fails to connect to a second MSC in said another network; and, (f) registering the location of said MS in a second VLR of said second MSC in said another network in response to said SERVICE RE-DIRECTION message from said first VLR.

9. The method as defined in claim 8, wherein said LOCATION REGISTRATION NOTIFICATION RETURN message is determined to include said service re-direction information if the identification (ID) of an MSC in said LOCATION REGISTRATION NOTIFICATION RETURN message is different from the ID of said first MSC.

10. The method as defined in claim 8, wherein said step (h) of registering the location of said MS in said second VLR further comprising the steps of:

transmitting a LOCATION REVISION REQUEST message from said MS to said second VLR;

transmitting a LOCATION REGISTRATION NOTIFICATION message from said second VLR to said HLR and deleting the location registration information of said MS in said first VLR;

transmitting, by said HLR, a LOCATION REGISTRATION COMPLETION message to said second VLR; and, storing, by said second VLR, the location registration information of said MS and transmitting a LOCATION REVISION ACCEPTED message to said MS.

11. A method for performing the network direct system selection (NDSS) of a mobile station (MS) in a cellular communications system to connect said MS from one network to another network, comprising the steps of:

(a) transmitting, by said MS, a CM SERVICE REQUEST message for requesting a call generation to a first MSC in said one network, said CM SERVICE REQUEST MESSAGE including a phone number dialed by said MS;

(b) searching, by said first MSC, the subscriber information of said MS from a first VLR coupled to said MSC and determining whether said MS is registered for said NDSS;

(c) transmitting a LOCATION REGISTRATION NOTIFICATION message from said first VLR to said HLR if the subscriber information of said MS is stored in said first VLR or if said MS is registered for said NDSS;

(d) transmitting, by said HLR, a LOCATION REGISTRATION NOTIFICATION RETURN message, which includes the subscriber information of said MS and a service re-direction information if said MS requires to be connected to said another network, to said first VLR;

(e) determining, by said first MSC, whether said LOCATION REGISTRATION NOTIFICATION RETURN message received in said first VLR includes said service re-direction information;

(f) if said LOCATION REGISTRATION NOTIFICATION RETURN message includes said service re-direction information, terminating the call connection between said first MSC and said MS and transmitting, by said first MSC, a SERVICE RE-DIRECTION message to said MS via said BS, said SERVICE REDIRECTION message including said service re-direction information and a command requesting said MS to report if said MS fails to connect to a second MSC in said another network; and, (g) generating a new call generation by said MS to said second MSC in response to said SERVICE RE-DIRECTION message.

12. The method as defined in claim 11, wherein said step (c) of transmitting said LOCATION REGISTRATION NOTIFICATION message further comprises the steps of:

determining whether the subscriber information of said MS is stored in said first VLR; and, transmitting said LOCATION REGISTRATION NOTIFICATION message from said first VLR to said HLR if there is no subscriber information of said MS previously stored in said first VLR.

13. The method as defined in claim 11, wherein said step (c) of transmitting said LOCATION REGISTRATION NOTIFICATION message further comprises the steps of:

determining whether the subscriber information of said MS is stored in said first VLR; and, determining whether said MS is registered for said NDSS if the subscriber information of said MS is previously stored in said first VLR;

transmitting said LOCATION REGISTRATION NOTIFICATION message from said first VLR to said HLR if said MS is registered for said NDSS.

14. The method as defined in claim 11, wherein said step (c) of transmitting said LOCATION REGISTRATION NOTIFICATION message further comprises the steps of:

determining whether the subscriber information of said MS is stored in said first VLR;

transmitting said LOCATION REGISTRATION NOTIFICATION message from said first VLR to said HLR if there is no subscriber information of said MS previously stored in said first VLR;

determining whether said MS is registered for said NDSS if the subscriber information of said MS is previously stored in said first VLR; and, transmitting said LOCATION REGISTRATION NOTIFICATION message from said first VLR to said HLR if said MS is registered for said NDSS.

15. The method as defined in claim 11, further comprising the step of establishing a call set-up with said first MSC with said MS if the subscriber information of said MS is stored in said first VLR and if said MS is not registered for said NDSS.

16. The method as defined in claim 11, wherein said CM SERVICE REQUEST message includes a failure information of the previous NDSS attempt by said MS.

17. The method as defined in claim 16, wherein said LOCATION REGISTRATION NOTIFICATION message includes said prior failure information received from said MS.

18. The method as defined in claim 16, further comprising the steps of:

determining, by said HLR, whether said LOCATION REGISTRATION NOTIFICATION message includes said prior failure information; and, establishing, by said HLR, a call set-up with said first MSC with said MS if said LOCATION REGISTRATION NOTIFICATION message includes said prior failure information.

19. The method as defined in claim 16, further comprising the steps of:

determining, by said HLR, whether said LOCATION REGISTRATION NOTIFICATION message includes said prior failure information; and, at the request of an operator, treating said CM SERVICE REQUEST by said MS to said first MSC as failure if said LOCATION REGISTRATION NOTIFICATION message includes said prior failure information.

20. The method as defined in claim 16, wherein said step (c) of transmitting said LOCATION REGISTRATION NOTIFICATION RETURN message further comprising the steps of:

determining, by said HLR, whether said LOCATION REGISTRATION NOTIFICATION message includes said prior failure information; and, determining, by said HLR, whether said MS requires to be connected to a second MSC in said another network if said LOCATION REGISTRATION NOTIFICATION message does not include said prior failure information.

21. The method as defined in claim 16, wherein said step (c) of transmitting said LOCATION REGISTRATION NOTIFICATION message further comprising the steps of:

determining, by said HLR, whether said LOCATION REGISTRATION NOTIFICATION message includes said prior failure information;

commanding, by said HLR, said first MSC to establish a call set-up with said MS if said LOCATION REGISTRATION NOTIFICATION message includes said prior failure information; and, determining, by said HLR, whether said MS requires to be connected to a second MSC of said another network if said LOCATION REGISTRATION NOTIFICATION message does not includes said prior failure information.

22. The method as defined in claim 16, wherein said step (c) of transmitting said LOCATION REGISTRATION NOTIFICATION message further comprising the steps of:

determining, by said HLR, whether said LOCATION REGISTRATION NOTIFICATION message includes said prior failure information;

commanding, by said HLR, the first MSC to treat said CM REQUEST from said MS as failure if said LOCATION REGISTRATION NOTIFICAITON message includes said prior failure information at the request of an operator; and, determining, by said HLR, whether said MS requires to be connected to a second MSC in said another network if said LOCATION REGISTRATION NOTIFICATION message does not include said prior failure information.

23. The method as defined in claim 16, wherein said subscriber information is determined to include said service re-direction information if the identification (ID) of an MSC in said service re-direction information is different from the ID of said first MSC.

24. The method as defined in claim 16, wherein said step (g) generating said new call generation by said MS to said second MSC in response to said SERVICE RE-DIRECTION message further comprising the steps of:

transmitting a second CM SERVICE REQUEST message from said MS to said second MSC via a second BS coupled to said second MSC;

requesting, by said second MSC, a second VLR coupled thereto for the subscriber information of said MS;

transmitting a second LOCATION REGISTRATION NOTIFICATION message from said second VLR to said HLR;

deleting the subscriber information of said MS previously stored in said first VLR coupled to said first MSC;

transmitting a second LOCATION REGISTRATION NOTIFICATION RETURN message including the subscriber information of said MS from said HLR to said second VLR; and, establishing a call set-up between said second MSC and said MS using the subscriber information of said MS stored in said second VLR.

* * * * *